United States Patent [19]

Card et al.

[11] 4,297,574

[45] Oct. 27, 1981

[54] RADON DETECTION

[76] Inventors: Jeffrey W. Card, 229 Argyle Ave., Apt. #308, Ottawa, Ontario, Canada, K2P 1B8; Keith Bell, 295 5th Ave., Ottawa, Ontario, Canada, K1S 2NP

[21] Appl. No.: 33,497

[22] Filed: Apr. 26, 1979

[30] Foreign Application Priority Data

Feb. 26, 1979 [CA] Canada .................................. 322299

[51] Int. Cl.$^3$ .......................... G01V 5/00; G01T 1/04
[52] U.S. Cl. ..................................... 250/253; 250/472
[58] Field of Search ............... 250/253, 254, 255, 256, 250/472, 473

[56] References Cited

U.S. PATENT DOCUMENTS

| | | | |
|---|---|---|---|
| 2,330,829 | 10/1943 | Lundberg et al. | 250/255 |
| 3,665,194 | 5/1972 | Alter et al. | 250/253 |
| 3,796,879 | 3/1974 | Obrycki | 250/362 |
| 3,968,371 | 7/1976 | Greendale | 250/255 |
| 4,156,138 | 5/1979 | Felice | 250/253 |

FOREIGN PATENT DOCUMENTS

| | | |
|---|---|---|
| 591415 | 1/1960 | Canada . |
| 631030 | 11/1961 | Canada . |
| 837735 | 3/1970 | Canada . |
| 859834 | 12/1970 | Canada . |
| 927526 | 5/1973 | Canada . |
| 994007 | 7/1976 | Canada . |
| 1032662 | 6/1978 | Canada . |

OTHER PUBLICATIONS

Croft, J. F. and Perry, K. E. G., 1962, An Experimental Study of the Behavior and Detection of Hazardous Radon Releases in Air, United Kingdom Atomic Energy Authority, Report AEEW-R149.

Dyck, W., 1969, Development of Uranium Exploration Methods Using Radon, Geological Survey of Canada, Paper 69-46.

Rutherford, E., 1913, Radioactive Substances and Their Radiations, Cambridge at the University Press, Chapters X & XIX.

McCorkell, R. D. and Card, Jeffrey W., 1978, The Decay Products of 222 Rn in Etched Track Radon Detection, Journal of Geochemical Exploration, vol. 10, pp. 277-293.

Soddy, Frederick, 1920, The Interpretation of Radium and the Structure of the Atom, John Murray.

Sutton, W. R. and Soonawala, N. M. 1975, A Soil Radium Method for Uranium Prospecting, Bulletin of the Canadian Institute of Mining and Metallurgy, vol. 68, No. 757, pp. 51-56.

*Primary Examiner*—Alfred E. Smith
*Assistant Examiner*—Janice A. Howell
*Attorney, Agent, or Firm*—Fleit & Jacobson

[57] ABSTRACT

A method of uranium exploration employs the detection of radon gas decay products to provide an indication of uranium mineralization. A plurality of collectors of similar surface areas are exposed to soil at or from spaced locations on an exploration site for a time sufficient for the decay products to deposit on the collectors and then, within substantially similar periods following the termination of the exposure, alpha particles, beta particles or gamma rays emitted from the collectors are measured and the measurements are compared. The collectors may be exposed to the soil in air spaces in or on the ground or in containers holding soil samples and may be electrically charged.

19 Claims, 4 Drawing Figures

RADON DETECTION

FIELD OF THE INVENTION

The present invention relates to methods of exploring for uranium by the detection of radon gas.

More particularly, the present invention is directed to the detection of radon or radium released to soil by uranium in, associated with, or derived by secondary geochemical processes from, uranium ore deposits or occurrences.

$^{222}$Rn is a radioactive inert gas with a half-life of about 3.8 days, and may emanate through soil from buried uranium ore deposits or occurrences, or from the primary or secondary dispersion halos associated with such deposits or occurrences.

The only known natural source of $^{222}$Rn is $^{226}$Ra, from which it is generated by radioactive decay.

Accordingly, an abundance of $^{222}$Rn may reflect an abundance of $^{226}$Ra, and such $^{226}$Ra may itself indicate the presence of uranium mineralization nearby.

The relationship between radon, or radium, and uranium may be a direct one, where a uranium deposit is buried under the soil cover, or it may be more indirect, such that geochemical interpretation is required to locate the deposit. For example, glacial processes may have transported radium-rich material laterally away from a deposit, and knowledge of the ice movement direction would be required in order to interpret the likely location of the deposit.

DESCRIPTION OF THE PRIOR ART

Various relatively complicated apparatuses and methods have previously been proposed for detecting radon. For example, Canadian Pat. Nos. 994,007 and 859,834 disclose apparatuses and methods employing impellor or pump means for passing an air sample through a filter to entrap particulate matter on the filter.

These prior methods and apparatuses have the disadvantage that the apparatus which they require is both relatively expensive and relatively complicated, and necessitates the use of a relatively powerful power source, and are therefore not convenient or suitable for uranium exploration in very remote locations. In addition, the use of air impellors, as required by these methods, may result in the transportation of dust particles bearing radioactive nuclides other than the decay products of radon; the activity of these nuclides may result in the registration of extraneous radioactivity counts.

Canadian Pat. No. 927,526 discloses a method of prospecting for uraniun and like radioactive deposits which exude a gaseous decay product, which method comprises mobile vapor phase tracking by detection radon and decay products downwind of an area being prospected to enable a charting of an aximuthal sector of density flow of the decay products, and then horizontally tracking the density flow towards the deposit from which it has diffused and marking the deposit as the density flow and diffusion vertically from the deposit coincide. However, no disclosure is contained in this prior patent which indicates how the decay product is collected and measured.

SUMMARY OF THE INVENTION

The present invention is based on appreciation of the fact that radon decay products in an enclosed air space tend to become deposited on any convenient solid surface within the air space. This occurs either spontaneously or in response to an electric field. In neither case is the use of air impellors required. In this way, the method is fundamentally different from any technique involving the physical entrapment of radionuclides on filters using forced air and is also fundamentally different from methods which require that air be forced into a chamber piror to collection of radionuclides by electrostatic precipitation.

Thus, according to the present invention there is provided a method of exploring for uranium mineralization which comprises the steps of disposing collectors in air spaces, closing the air spaces, leaving the collectors in position in the air spaces for a period of time sufficient for decay products of radon to become deposited on the collectors, and subsequently measuring alpha particles, beta particles or gamma rays emitted by decay of the decay products deposited on the collectors.

The expression "collector" as employed herein means a solid article, for example in the form of a strip, wire, plate or other shape, which has a collecting surface suitable for the deposition of the decay products of radon.

An enclosed air space suitable for application of the present invention may be a hole in the ground, an open-bottomed cylinder covering an area of ground, or a sealable container. Radon is provided to the enclosed air space by diffusion from the soil pore spaces and by natural air currents operating through the pore space network. The application of Fick's Laws on diffusion by Tanner (TANNER, ALLAN B., 1964, Radon Migration In The Ground: A Review, In The Natural Radiation Environment, The University Of Chicago Press, pp 161-190.) has shown that radon may be transferred through several meters of dry soil by diffusion processes based solely on the random thermal vibrations of radon atoms. The work by present inventor has shown that sufficient radon is introduced into enclosed air spaces to allow the delineation of an anomaly at a known uranium occurrence; the results have been achieved using radon which has been mobilized only by natural processes, without the use of any contrived device to stimulate air movement.

The decay products which may conveniently be collected and subsequently measured are, with their approximate half-lives, as follows:

| Decay Product | Approximate Half-Life |
| --- | --- |
| $^{218}Po$ | 3.05 minutes |
| $^{214}Pb$ | 26.8 minutes |
| $^{214}Bi$ | 19.7 minutes |
| $^{214}Po$ | $1.64 \times 10^{-4}$ seconds |

Once a decay-product atom has become collected on a collector, it is not readily removed. In particular, if an atom is in a certain form when becoming attached to the collector, it remains on the collector during the successive decay through all subsequent forms. Radon gas atoms do not become attached to the collector; a radon atom must decay before the resulting decay product atom may be collected.

To assist the deposition of the decay products on the collector, an electrical charge may be applied to the collector.

It has been found that the total number of decay product atoms on the collector does not increase significantly after a three hour exposure in a volume of air of constant, or approximately constant, radon concentration.

BRIEF DESCRIPTION OF THE DRAWINGS

The invention will be more readily understood from the following description of preferred embodiments thereof given, by way of example, with reference to the accompanying drawings, in which.

DESCRIPTION OF PREFERRED EMBODIMENTS

Figure 1:
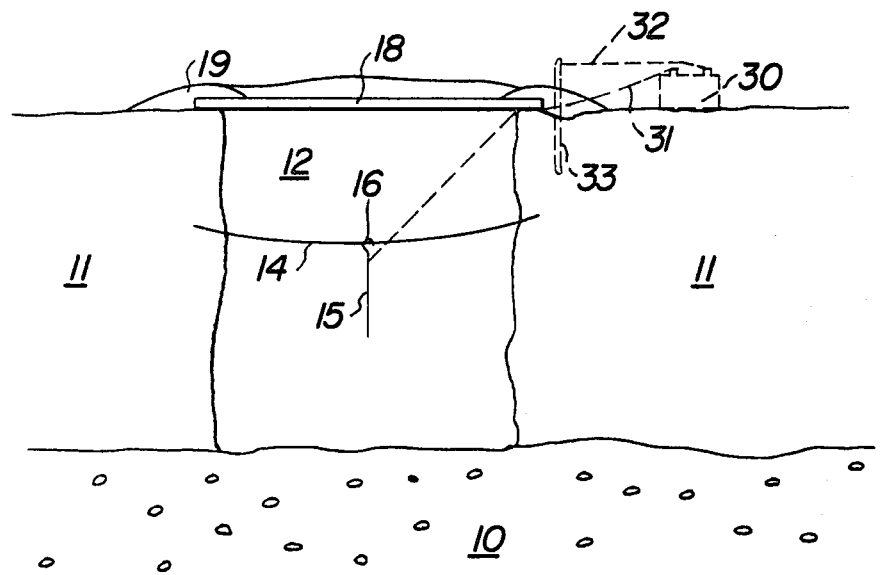
FIG. 1 shows a view taken in vertical cross-section through a hole in the ground which is being employed to perform one method according to the present invention.

FIG. 1 shows a layer of bedrock 10, on which lies a layer of soil 11.

By means of a post-hole auger, a hole 12 is dug in the soil layer 11 down to the bedrock 10, and a wire 14 is then positioned in the hole 12, with opposite ends of the wire 14 inserted into the soil layer 11 at opposite sides of the hole 12 so that the wire 14 extends, approximately, along a diameter of the hole 12.

A collector plate 15 is suspended from the wire 14 by means of a hook 16 at the top of the collector plate 15.

The collector plate 15 is spaced from the sides and from the bottom of the hole 12 and, in fact, the wire 14 is positioned centrally within the hole 12 but at a sufficient height above the bottom of the hole 12 to ensure that the wire 14 and the collector plate 15 remain above the level of any water which may seep into the hole 12.

The hole 12 is then covered with a sheet of plywood 18 or other relatively impermeable material, and loose soil, for example soil removed from the soil layer 11 by the digging of the hole 12, is packed around the edges of the plywood sheet 18 as indicated by reference numeral 19 so as to provide a more or less airtight seal between the plywood sheet 18 and the soil layer 11.

With the collector plate 15 thus suspended within the hole 12, and the hole 12 closed by the plywood sheet 18, the hole, its contents and the plywood sheet 18 and the soil seal 19 are left undisturbed for a suitable period sufficient to allow deposition on the collector plate 15 of the decay products of any radon gas which may be emanating from either a uranium ore deposit or a geochemical dispersion halo in the vicinity of the hole 12.

As mentioned hereinbefore, the period of such exposure of the collector plate may be as short as three hours since the total number of decay product atoms deposited on the collector plate will not increase significantly after that period of time.

Figure 4:
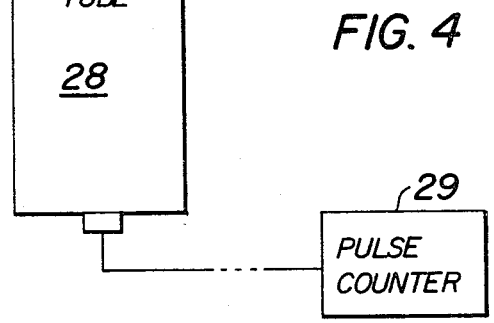
FIG. 4 shows a side view of a scintillation chamber and related apparatus for use in the methods of FIGS. 1 and 2.

At the end of this period, the collector plate 15 is removed from the hole 12 and is inserted into, and suspended in, the detecting volume of an alpha-sensitive, silver-activated zinc-sulfide-coated scintillation chamber, indicated generally by reference numeral 20 in FIG. 4.

The scintillation chamber 20 has a cell housing 21 containing a silver-activated zinc-sulfide-coated cell 22 defining the detecting volume or chamber 23.

The cell housing is provided with a removable cover 25, from which the collector plate 15 is suspended by means of a loop 26 of copper wire.

The underside of the detecting chamber 23 is optically coupled, by a transparent plastics material window 27, to a photomultiplier tube 28, which is electrically connected to a pulse container 29.

With the collector plate 15 thus disposed within the scintillation chamber 20, the decay activity of the radon decay products deposited on the collector plate 15 while the latter was suspended, as described hereinbefore, in the hole 12 are counted by the pulse counter 29 for as long as is required to minimize error due to counting statistics. A counting interval as short as five minutes is sufficient.

The hole 12 need not necessarily penetrate to bedrock, and in many cases the overburden may be too deep to permit this. In some cases, the hole may satisfactorily penetrate or approach the secondary dispersion halo associated with the exploration target.

The above-described method may be modified by employing an existing hole instead of specially digging the hole 12. Types of existing holes which may be suitable for this purpose include diamond drill holes, which penetrate both the overburden and underlying solid rock, and overburden drill holes, which penetrate the overburden only.

A further possibility is to employ, instead of a hole in the ground, an open-bottomed enclosure placed on the ground to enclose an air space at and above the gound surface.

Referring again to FIG. 1, it will be appreciated that a larger number of decay products will be collected on the collector plate 15 during the exposure period if an electrical charge is applied to the collector plate 15. More particularly, the number of decay products collected will be a function of the potential difference provided by the charge, and it has been found that a potential difference of 400 volts is sufficient.

For this purpose, a d.c. power source 30 comprising a plurality of dry cells connected in series may be employed.

In this case, the opposite terminals of the d.c. power source 30 may be connected by electrical leads 31 and 32 to the collector plate 15 and to a spike 33, respectively, the spike 33 being inserted into the soil layer 11 in the vicinity of the hole 12.

The dry cells employed in the d.c. power source 30 may, for protection during wet weather, be packed into a plastics material container, the leads 31 and 32 being passes through openings in the container and such openings being subsequently sealed with waterproof glue.

For convenience, the lead 31 may be connected to the collector plate 15 by means of an alligator clip (not shown).

Also, in this case the wire 14 is of electrically non-conductive material to avoid grounding the collector plate 15.

A significant proportion of the decay products may become attached to aerosols or other microscopic, or submicroscopic, particles. This may occur soon after creation of the decay products by decay of $^{222}$Rn. Some of these particles are positively-charged, and others are negatively-charged. Those which are negatively-charged will be collectible at a cathode, and those which are positively-charged will be collectible at an anode. The remainder of the decay products, also representing a significant proportion of the total, will be unattached. These decay products are probably negatively-charged and will be collectible at a cathode. In most environments, a larger number of decay products will be collected on a collector which acts as a cathode (i.e., attracts negatively-charged particles). Under certain conditions, it is possible that more activity will be collected at a collector which acts as an anode. It is recommended that, when using charged collectors, a brief orientation study be performed at a few representative sites, to compare the number of counts on collectors as cathodes to the number of counts on collectors as anodes. The configuration giving the greatest number of counts is used, as this represents the arrangement under which the highest sensitivity is achieved.

The longer the charge is applied, up to about three hours, the greater will be the proportion of decay products collected. Application of the charge for longer than three hours will not appreciably increase the activity on the collector.

For comparability of results from one site to another, all collectors are the same size and shape, within the precision normally obtained by measurements with an ordinary ruler. Similarity of collector size is maintained whether or not the collector is charged. Radon decay product activity on a collector steadily declines, by decay, after removal of the collector from the radon-bearing air. For comparability of results, it is necessary to start and end the counting intervals for each of the collectors at the same times after termination of the exposure. Errors of ten seconds or less in timing do not significantly affect the comparability of the results. In addition, comparability of results is enhanced by using, as far as is convenient with respect to depth of overburden and depth to the water table, holes of similar diameters and depths, with the collector suspended in a similar relative position in each hole. Tests have shown that holes having a diameter of about 19 centimeters and a depth of about 30 centimeters provide acceptable results.

Figure 2:
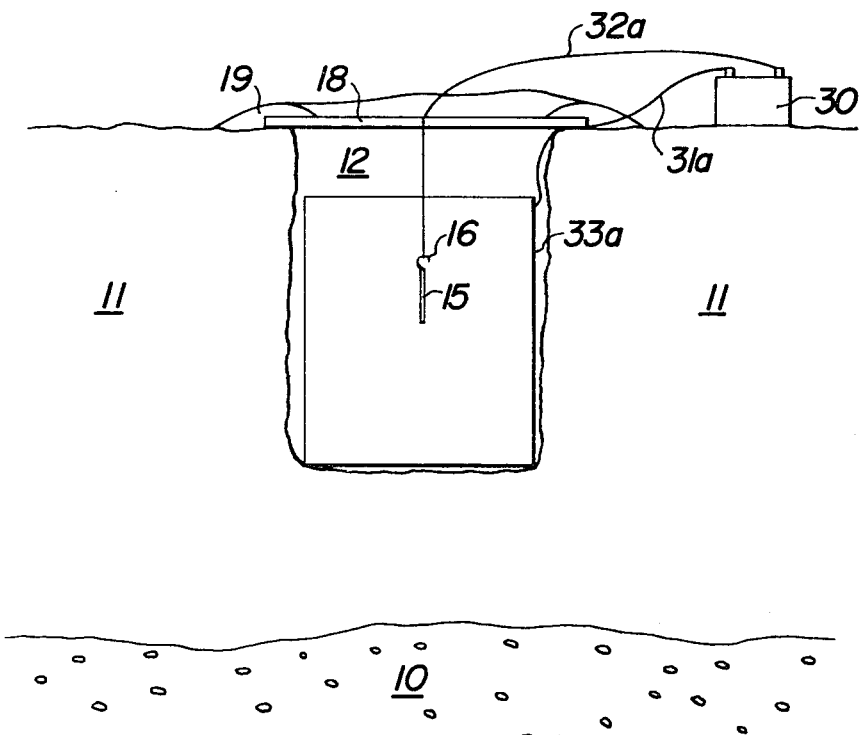
FIG. 2 shows a modification of the arrangement of FIG. 1.

FIG. 2 illustrates a modification of the arrangement of FIG. 1 and, for convenience, like reference numerals have been employed in FIG. 2 to indicate like parts.

In FIG. 2, the wire 14 and the grounding spike 33, have been omitted.

Instead of suspending the collector plate 15 from the wire 14, it is in this case suspended from an electrical lead 32a connected to one terminal of the d.c. power source 30, the lead 32a being secured to the plywood sheet 18 and extending downwardly through the plywood sheet 18 to the hook 16.

The opposite terminal of the d.c. power source 30 is connected by an electrical lead 31a to a cylindrical wire screen or sheet metal cylinder 33a disposed more or less concentrically in the hole, so that the collector plate 15 is suspended within and electrically insulated from the screen or cylinder 33a.

Figure 3:
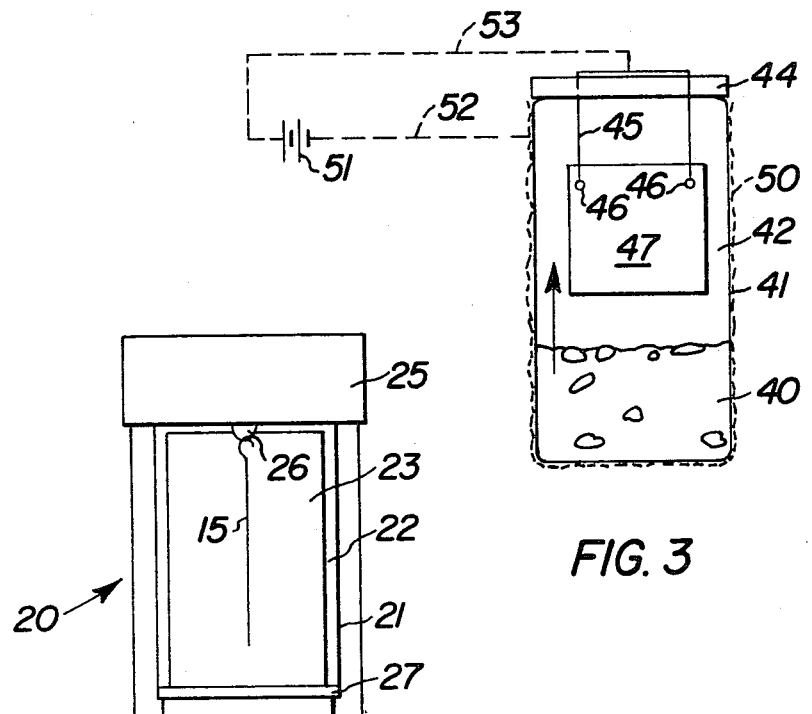
FIG. 3 shows a diagrammatic view of a container being used to perform another method according to the present invention.

An alternative method of radon gas detection, employing a soil sample, is now described with reference to FIG. 3.

To obtain a measure of the radium content of a soil sample 40, the soil sample is inserted into a glass jar 41, or other sealable container, so that the soil sample 40 lies at the bottom of the glass jar 41 with an air space 42 left above the soil sample 40.

The jar 41 is provided with an airtight closure 44, and a length of copper wire 45 is bent into a U-shape and the two arms of the U-shaped wire 45 are then inserted downwardly through respective holes in the closure 44 and formed at their free ends into hooks, which are engageable in a pair of corresponding openings 46 formed in a collector plate 47 for suspending the collector plate 47 in the air space 42 below the jar closure 44. A predetermined mass of soil sample 40 is placed in the jar 41 and, with the collector plate 47 suspended as described above and the jar 41 closed in an airtight manner by the closure 44, the collector plate 47 is left in suspension above the soil sample 40 for an exposure period to allow radon to develop by decay of radium in the soil sample 40. Some of this radon migrates into the air space 42, where it eventually decays, thus providing short-lived decay products, some of which are deposited on the collector plate 47.

To ensure that the jar 41 is kept airtight during this exposure period, the holes in the closure 44 through which the arms of the U-shaped wire 45 extend are previously made airtight by sealing them with glue.

A waiting period of thirty days, several half-lives of $^{222}$Rn, results in a close approximation to radioactive equilibrium between the radon in the jar 41 and the supporting radium. If a waiting period of thirty days is not feasible, a shorter waiting period may be used. In this event, results are divided by $1-e^{-\lambda t}$, where $\lambda$ is the decay constant for $^{222}$Rn, and t is the waiting period used, to obtain a normalized result equivalent to that which would be expected by waiting a large number of half-lives of $^{222}$Rn. In a closed system, the amount of radon activity becomes equal to one-half of the amount of the activity of the supporting radium after a waiting period of one half-life of $^{222}$Rn. (3.8 days, i.e. approximately 4 days).

After termination of the waiting period, the collector plate 47 is inserted into the scintillation counter 20, and the collected decay product activity counted as described hereinbefore with respect to the collector plate 15.

The method of radon detection described above with reference to FIG. 3 may be modified by applying a charge to the collector plate 47.

For this purpose, the jar 41 is wrapped in an aluminum foil, shown in broken lines and indicated by reference numeral 50, and the opposite terminals of a d.c. power source 51 are connected by electrical leads 52 and 53 to the aluminum foil 50 and the copper wire 45, respectively.

The charge need only be applied for a time interval immediately prior to removal of the collector plate 47 from the jar 41. The number of decay products collected will be very close to maximum if the charge is applied for three hours. A potential difference of 400 volts is sufficient.

It will be appreciated that, when a plurality of soil samples are tested, the same charge must be applied to all collector plates, and the same time interval for charging, if less than three hours, must be used.

Further, for analysis of a plurality of soil samples, uniformity of size and shape of the collectors and jars must be maintained, and a similar mass of each soil sample must be used. All collector counting intervals must commence and end at the same number of minutes after termination of the exposure, and a brief set of orientation analyses should be performed to see whether the anode or the cathode is the most effective collector, for the reasons described hereinbefore with reference to FIG. 1.

Tests have shown that good soil sample analytical results are obtained using samples having a mass of about 50 grams and glass jars having a total internal volume of about 225 milliliters. For a given volume of glass jar, a larger number of counts is registered for larger masses of sample.

The number of decay products collected is a function of the surface area of the collectors. Consequently, collectors with larger surface areas collect more decay products than those with smaller surface areas. The number of decay products collected is not a function of the material used as the collector, when common materials such as silver, copper, brass, gold, platinum and aluminum are compared. Furthermore, cardboard and plastics materials are generally equally as effective as metals of similar surface area, but an electrical charge cannot readily be placed on a collector made of cardboard or plastics material.

From time to time it may be suspected that decay products of $^{220}$Rn, the radon isotope which occurs in the $^{232}$Th decay series, may have contributed to the counts obtained during an application of this invention. Where this has occurred, it is possible to estimate the number of counts so contributed by storing the collector in a radon-free atmosphere, i.e., in a sealed jar, for several hours, and then counting it again. After this length of time, all of the $^{222}$Rn decay products will have decayed to negligible levels. The decay pattern of nuclides in the $^{220}$Rn decay series is strongly influenced by $^{212}$Pb, which has a half-life of about 10.6 hours, and by $^{212}$Bi, which has a half-life of about 60.5 minutes. The activity measured several hours after termination of the exposure may be used in an arithmetical computation involving the application of equations for successive radioactive transformations to estimate the amount of activity intially contributed by decay products of $^{220}$Rn.

The invention may be used as an aid in evaluating the extent of mineralization discovered by other exploration methods. In addition, the invention may be used to locate previously-undiscovered mineralization. In both cases the techniques hereinbefore described may be applied on a grid or other plurality of spaced-apart locations on the earth's surface. Many applications of the technique will show that only negligible amounts of radon and/or radium are present, and this information will indicate that no uranium mineralization is present. Alternatively, the observation of significant amounts of radon and/or radium may indicate that uranium mineralization is present.

The embodiments of the invention in which an exclusive property or priviledge is claimed are defined as follows:

1. A method of exploring for uranium by detecting decay products of radon as an indication of the presence of uranium mineralization, comprising the steps of:
providing, at respective spaced-apart locations at a uranium exploration site, a plurality of decay product collectors having at least substantially similar surface areas;
enclosing each of said collectors at its respective location in an air space in which said collectors are exposed to radon migrating from the ground;
the enclosure of the air spaces maintaining the air within the air spaces in a substantially undisturbed condition during the exposure of said collectors;
continuing the exposure of said collectors for a period of time sufficient for the radon to migrate by natural processes into the air spaces and for the decay products of the migrating radon to become deposited on said collectors;
terminating the exposure of said collectors;
measuring alpha particles, beta particles or gamma rays emitted by decay of the decay products deposited on said collectors;
the measurements of the alpha particles, beta particles or gamma rays being initiated at at least substantially equal respective time intervals following the terminations of the exposures of said collectors and being effected over at least substantially equal measurement periods; and
comparing the measurements thus obtained from the spaced-apart locations to provide an indication of the presence or absence of uranium mineralization at, or geologically associated with, the uranium exploration site.

2. A method as claimed in claim 1, wherein said period of time is at least three hours.

3. A method as claimed in claim 1, which includes applying an electrical charge to the collector during the deposition of the decay products.

4. A method as claimed in claim 3, wherein the electrical charge is applied to the collector by connecting one pole of a d.c. power source to the collector and grounding another pole of the power source in the vicinity of the hole.

5. A method as claimed in claim 3 or 4, wherein the electrical charge is applied to the collector for a period of at least three hours.

6. A method as claimed in claim 1, which includes employing holes in the ground at the spaced-apart locations as said air spaces, the enclosure of said air spaces being effected by covering said holes.

7. A method as claimed in claim 6, in which said holes are of substantially similar sizes and depths.

8. A method as claimed in claim 7, wherein said collectors are exposed in substantially similar positions in said holes.

9. A method as claimed in claim 1, 6 or 7, further including the step of maintaining said collectors in a radon-free atmosphere, subsequent to the measurement, for a time sufficient for any $^{222}$Rn decay products on said collectors to decay to negligible levels, and then repeating the measurements to determined the effect of any $^{220}$Rn decay products deposited on said collectors.

10. A method as claimed in claim 1, 6 or 7, wherein said spaced-apart locations are on a grid.

11. A method as claimed in claim 6, 7 or 8, in which each of said collectors is suspended in its respective hole at a spacing from the walls and the bottom thereof.

12. A method as claimed in claim 1, 2 or 3, which includes employing a material selected from the group consisting of plastic, cardboard, silver, copper, brass, gold, platinum and aluminum as said collectors.

13. A method as claimed in claim 1, 2 or 3, which includes employing an alpha-sensitive, silver-activated zinc-sulfide-coated scintillation chamber optically coupled to a photomultiplier tube connected to a power supply and a pulse counter for counting the decay product activity on said collectors.

14. A method as claimed in claim 1, 2 or 3, which includes employing a metal selected from the group consisting of copper, silver and aluminum as said collectors.

15. A method of exploring for uranium by detecting decay products of radon as an indication of the presence of uranium mineralization, comprising the steps of:
collecting soil samples from respective spaced-apart locations at a uranium exploration site;

enclosing said samples in respective containers with air spaces above said samples within said containers;

positioning decay product collectors in said air spaces, said decay product collectors having at least substantially similar surface areas;

closing each of said containers for a period of time sufficient for radon to accumulate by growth from radium and to migrate into said air spaces and for the decay products of the radon to become deposited on said collectors;

the closure of the air spaces maintaining the air within the said spaces in a substantially undisturbed condition during the exposure of said collectors;

terminating the exposure of said collectors;

measuring alpha particles, beta particles or gamma rays emitted by decay of the decay products deposited on said collectors;

the measurements of the alpha particles, beta particles or gamma rays being initiated at at least substantially equal respective time intervals following the terminations of the exposure of said collectors and being effected over at least substantially equal measurement periods; and comparing the measurements thus obtained from the spaced-apart locations to provide an indication of the presence or absence of uranium mineralization at or geologically associated with the uranium exploration site.

16. A method as claimed in claim 15, in which each of said collectors is exposed in its respective air space for a period of at least four days.

17. A method as claimed in claim 15, in which each of said collectors is exposed in its respective air space for a period of at least thirty days.

18. A method as claimed in claim 15, which includes applying an electrical charge to each of said collectors during the exposure thereof.

19. A method as claimed in claim 18, wherein the electrical charge is applied to each of said collectors by connecting one pole of a respective d.c. power souce to the collector and the other pole to a metal jacket enclosing the air space in which said collector is disposed.

* * * * *